(12) United States Patent
Chung et al.

(10) Patent No.: US 9,335,463 B2
(45) Date of Patent: May 10, 2016

(54) DISPLAY APPARATUS

(71) Applicant: SAMSUNG ELECTRONICS CO., LTD., Suwon-si (KR)

(72) Inventors: Seong Eun Chung, Seoul (KR); Il Yong Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/223,105

(22) Filed: Mar. 24, 2014

(65) Prior Publication Data

US 2014/0204308 A1 Jul. 24, 2014

Related U.S. Application Data

(63) Continuation of application No. 13/090,403, filed on Apr. 20, 2011, now Pat. No. 8,717,512.

(30) Foreign Application Priority Data

Apr. 20, 2010 (KR) ................. 10-2010-0036413

(51) Int. Cl.
*G02F 1/1333* (2006.01)
*F21V 8/00* (2006.01)

(52) U.S. Cl.
CPC ............ *G02B 6/0088* (2013.01); *G02B 6/0031* (2013.01); *G02F 1/133308* (2013.01); *G02B 6/0091* (2013.01); *G02F 2001/13332* (2013.01); *G02F 2001/133331* (2013.01)

(58) Field of Classification Search
None
See application file for complete search history.

(56) References Cited

U.S. PATENT DOCUMENTS

| | | | |
|---|---|---|---|
| 8,717,512 B2* | 5/2014 | Chung et al. | 349/58 |
| 2005/0094039 A1* | 5/2005 | Kim | G02F 1/133308 349/12 |
| 2006/0274223 A1 | 12/2006 | Hsu | |
| 2008/0074028 A1 | 3/2008 | Ozolins et al. | |
| 2010/0073595 A1 | 3/2010 | Zhang et al. | |
| 2010/0085502 A1 | 4/2010 | Yen et al. | |
| 2010/0265425 A1* | 10/2010 | Kawaguchi | G02F 1/133308 349/58 |
| 2011/0128463 A1 | 6/2011 | Ji et al. | |
| 2012/0050635 A1 | 3/2012 | Yoo et al. | |

FOREIGN PATENT DOCUMENTS

| | | |
|---|---|---|
| CN | 1818757 A | 8/2006 |
| CN | 101180666 A | 5/2008 |
| CN | 101261789 A | 9/2008 |
| CN | 101281312 A | 10/2008 |
| CN | 101344681 A | 1/2009 |
| JP | 2-287430 A | 11/1990 |
| JP | 2004119031 A | 4/2004 |
| JP | 2007-010881 A | 1/2007 |
| JP | 2007-232809 A | 9/2007 |
| WO | 2009130955 A1 | 10/2009 |

OTHER PUBLICATIONS

Communication, dated Aug. 14, 2013, issued by the European Patent Office in counterpart European Application No. 11 162 889.7.
Communication dated Jul. 21, 2011 issued by the European Patent Office in counterpart European Application No. 11162889.7.

(Continued)

*Primary Examiner* — Sung Pak
(74) *Attorney, Agent, or Firm* — Sughrue Mion, PLLC

(57) ABSTRACT

A display apparatus includes a display part operable to display an image; and a bezel part disposed at an edge of the display part, wherein at least a portion of a front surface of the display part and a front surface of the bezel part are coplanar.

5 Claims, 6 Drawing Sheets

(56) References Cited

OTHER PUBLICATIONS

Communication dated Sep. 19, 2014, issued by the State Intellectual Property Office of the People's Republic of China in counterpart Chinese Application No. 201110100332.3.

Communication dated Apr. 27, 2015, issued by the State Intellectual Property Office of the People's Republic of China in counterpart Chinese Application No. 201110100332.3.

* cited by examiner

DISPLAY APPARATUS

CROSS-REFERENCE TO RELATED APPLICATION

This is a continuation application of U.S. patent application Ser. No. 13/090,403 filed in the U.S. Patent and Trademark Office on Apr. 20, 2011, which claims priority from Korean Patent Application No. 10-2010-0036413, filed on Apr. 20, 2010 in the Korean Intellectual Property Office, the disclosures of which are incorporated herein by reference.

BACKGROUND

1. Field

Exemplary embodiments of the present invention relate to a display apparatus including a display part to display an image and a bezel part provided at the edge of the display part.

2. Description of the Related Art

Apparatuses consistent with exemplary embodiments of the present invention relate to a display panel on which an image is displayed, including liquid crystal panels and/or plasma display panels (PDPs).

A display apparatus includes a display part to display an image and a bezel part provided at the edge of the display part to support the display part. Recently, in keeping with the trend towards an increasing emphasis on external design and spatial minimization, there has been an increasing desire to minimize the width of the bezel part.

SUMMARY

Exemplary embodiments of the present invention may overcome the above disadvantages and other disadvantages not described above. Also, the present invention is not required to overcome the disadvantages described above, and an exemplary embodiment of the present invention may not overcome any of the problems described above.

An aspect provides a display apparatus including a display part operable to display an image; and a bezel part disposed at an edge of the display part, wherein at least a portion of a front surface of the display part and a front surface of the bezel part are coplanar.

The display apparatus may further include: a glass member which is transparent; a film member disposed on a front surface of the glass member; a frame which supports a side surface of the glass member; and a support member which supports the glass member with respect to the frame, wherein the support member includes a front support part which supports both a front surface of the frame and a first portion of the front surface of the glass member, wherein the film member has a same thickness as the front support part and is disposed on a second portion of the front surface of the glass member, and wherein the display part includes the film member and the bezel part includes the front support part.

The display apparatus may further include an optical sheet disposed at a rear of the glass member, wherein the frame includes a support rib which protrudes from an inner surface of the frame and supports a portion of at least one of a rear surface of the glass member and a portion of the optical sheet, and wherein the front support part has a width corresponding to a width of the support rib.

The film member may include a polarizing film.

The display apparatus may further include: a glass member which is transparent; a frame which supports a side surface of the glass member; and a support member which supports the glass member with respect to the frame, wherein the support member includes a front support part which supports both a front surface of the frame and a portion of a front surface of the glass member, wherein the glass member includes an installation recess, which is at an edge of the front surface of the glass member and has a depth corresponding to a thickness of the front support part, which accommodates the front support part, and wherein the display part a portion of the glass member and the bezel part includes the front support part.

The display apparatus may further include an optical sheet disposed at a rear of the glass member, wherein the frame includes a support rib which protrudes from an inner surface of the frame and supports the at least one of a portion of a rear surface of the glass member and a portion of the optical sheet, and wherein the front support part has a width corresponding to a width of the support rib.

The display apparatus may further include a film member disposed on at least one of a front surface of the bezel part and a front surface of the display part.

The display apparatus may further include a second film member which is disposed on a rear surface of the optical sheet.

The display apparatus may further include: a glass member which is transparent; an optical sheet disposed at a rear of the glass member; and a frame which supports a side surface of the glass member, wherein a front surface of the frame is coplanar with a front surface of the glass member, wherein the frame includes a support rib which protrudes from an inner surface of the frame and supports at least one of a portion of the rear surface of the glass member and a portion of the optical sheet, and wherein the bezel part includes the front surface of the frame and the support rib and the display part includes a portion of the front surface of the glass member.

The display apparatus may further include a film member which is disposed on at least one of a front surface of the bezel part, a portion of the front surface of the glass member, another front surface of the glass member, the front surface of the frame and a surface of the support rib.

Another aspect provides a display apparatus which may include: a light source which generates light; a light guide member having a plate shape, wherein the light irradiated by the light source is incident upon a side surface of the light guide member; a liquid crystal panel disposed in front of the light guide member;

a glass member which is transparent and disposed in front of the liquid crystal panel; and a frame which supports a side surface of the glass member, wherein the light source includes a plurality of light emitting diodes which generate the light, wherein the plurality of light emitting diodes is disposed at a rear portion of a space between an inner surface of the frame and the side surface of the light guide member, wherein the light is irradiated through the space between the inner surface of the frame and the side surface of the light guide member, and wherein the inner surface of the frame includes a reflective plane which guides the light irradiated by the plurality of light emitting diodes toward the side surface of the light guide member.

The light source further may include a substrate on which the plurality of light emitting diodes is arranged in a line.

The display apparatus may further include a rear cover which covers a rear surface of the light guide member, wherein the rear cover includes a light source installation part, which extends backwards from a side end of the rear cover and supports a rear surface of the substrate.

The display apparatus may further include a spacer having a front surface, which is supported by the rear surface of the light guide member, and a rear surface, which is supported by the substrate, wherein the spacer separates the substrate from a rear portion of the light guide member.

The rear cover may further include: a spacer part which extends backwards from a side end of the rear cover and supports a front surface of the substrate; and a light source installation part which extends from the spacer part and supports a rear surface of the substrate.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
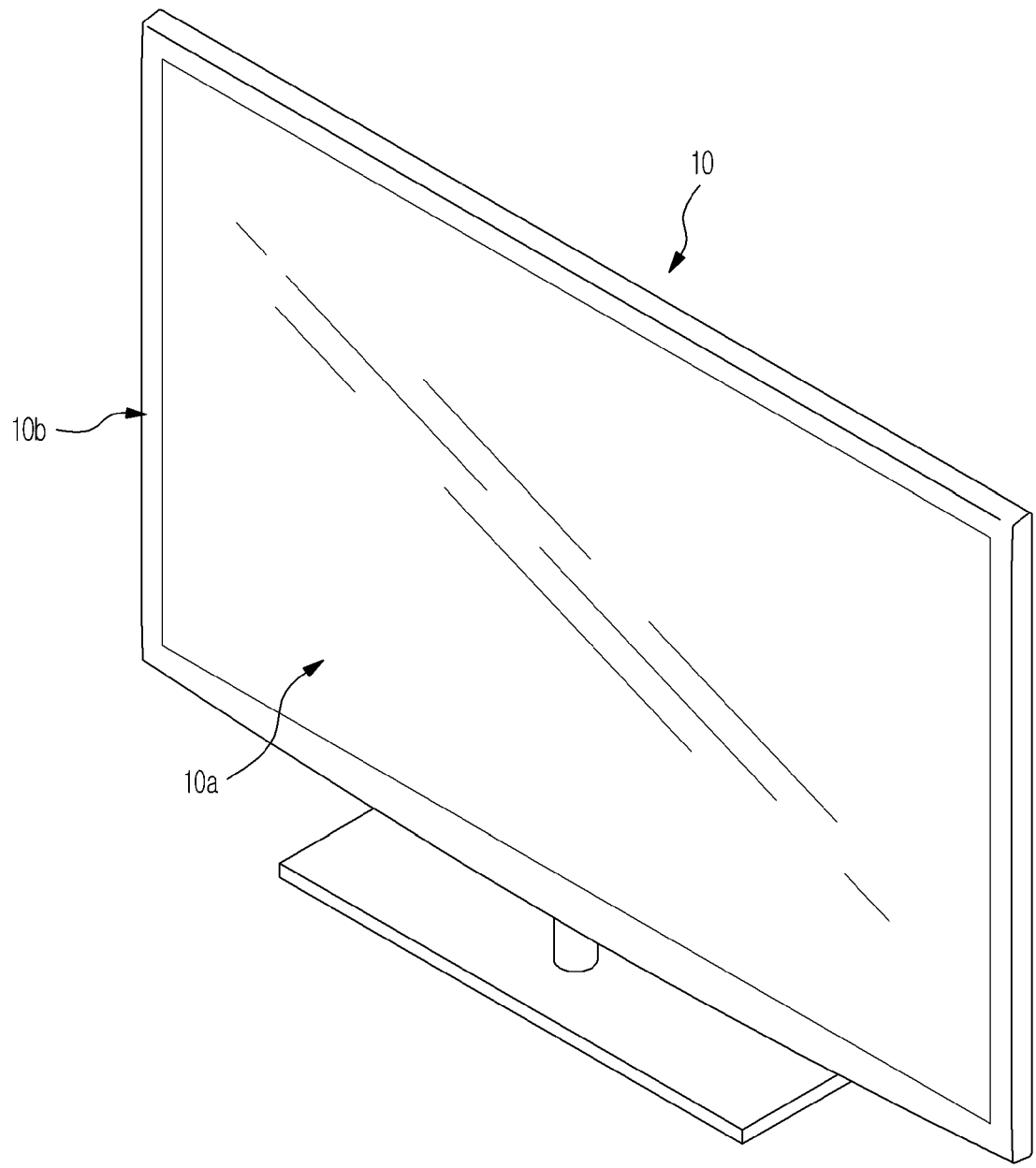
FIG. 1 is a perspective view of a display apparatus in accordance with one exemplary embodiment of the present invention.

Reference will now be made in detail to the exemplary embodiments of the present invention, examples of which are illustrated in the accompanying drawings, wherein like reference numerals refer to like elements throughout.

Hereinafter, a display apparatus in accordance with one exemplary embodiment of the present invention will be described in detail with reference to the accompanying drawings.

As shown in FIG. 1, a display apparatus 1 in accordance with this exemplary embodiment includes a display part 10a to display an image and a bezel part 10b formed at the edge of the display part 10a.

Figure 2:
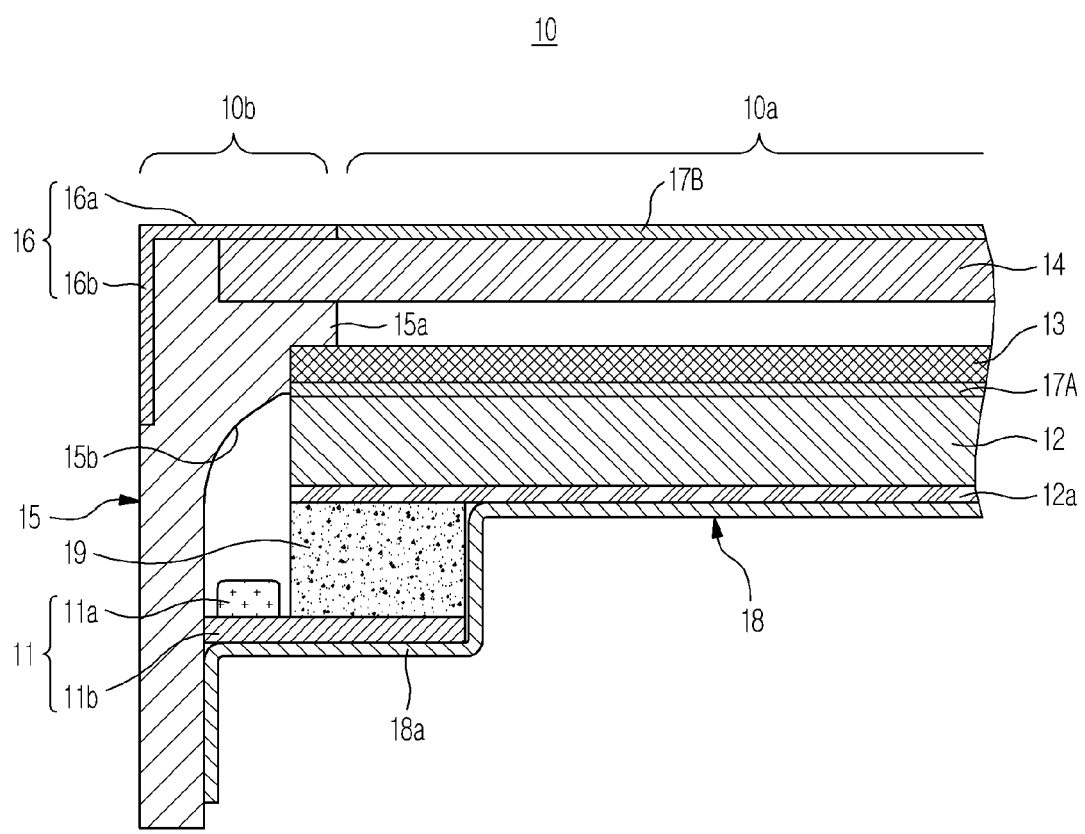
FIG. 2 is a cross-sectional view of the display apparatus in accordance with the exemplary embodiment of the present invention.

Further, as shown in FIG. 2, the display apparatus 10 includes a light source 11 to generate light, a light guide member 12 formed in a rectangular plate shape to guide the light generated by the light source 11 forwards, an optical sheet 13 including a liquid crystal layer, formed in a shape corresponding to the shape of the light guide member 12 and disposed in front of the light guide member 12, a glass member 14 formed in a rectangular plate shape, disposed in front of the optical sheet 13 and made of a transparent material so as to transmit light, a frame 15 formed in a rectangular ring shape to support four side surfaces of the glass member 14, a support member 16 to maintain a state in which the glass member 14 is installed on the frame 15 (i.e., the support member 16 supports the glass member 14 with respect to the frame 15), and a rear cover 18 to support the rear surface of the light guide member 12.

The light source 11 includes a plurality of light emitting diodes 11a to generate light and a substrate 11b on which the plurality of light emitting diodes 11a is arranged in a line.

The light guide member 12 is formed in a plate shape. Light irradiated by the light source 11 is incident upon the light guide member 12 through the side surface thereof, and is then guided forwards. A reflective sheet 12a is disposed on the rear surface of the light guide member 12 so as to reflect the light forwards.

In this exemplary embodiment, the front surface of the glass member 14 and the front surface of the frame 15 are substantially coplanar. In order to maintain such a state in which the front surface of the glass member 14 and the front surface of the frame 15 are coplanar, a support rib 15a protruded integrally from the inner surface of the frame 15 to support the edge of the rear surface of the glass member 14 is formed on the frame 15.

In this exemplary embodiment, the support rib 15a is formed at a position having the same depth as the thickness of the glass member 14, and the optical sheet 13 and the light guide member 12 are sequentially installed on the rear surface of the support member 16. Here, light having passed through the edge of the light member 12 supported by the support rib 15a is blocked by the support rib 15a, and thus is not transmitted to the front of the support rib 15a. Therefore, a front support part 16a of the support member 16 may have a width corresponding to that of the support rib 15a.

The support member 16 includes the front support part 16a to support the edge of the front surface of the glass member 14 and the front surface of the frame 15, and a side support part 16b extended backwards from the front support part 16a to support the side surfaces of the frame 15. Thereby, the support member 16 prevents the glass member 14 from being separated from the frame 15.

A film member 17B is disposed on the remaining portion of the front surface of the glass member 14 excluding the edge of the front surface of the glass member 14 supported by the front support part 16a. If the display apparatus 10 has the above structure, a region of the display apparatus 10 provided with the film member 17B disposed thereon constitutes the display part 10a, and a region of the display apparatus 10 provided with the front support part 16a provided thereon constitutes the bezel part 10b. The film member 17B has the same thickness as that of the front support part 16a. If the front support part 16a and the film member 17B have the same thickness and the front support part 16a and the film member 17B are disposed on the front surfaces of the frame 15 and the glass member 14, which are substantially coplanar, the front surface of the front support part 16a and the front surface of the film member 17B become coplanar and thus the front surface of the display part 10a and the front surface of the bezel part 10b become coplanar.

In this exemplary embodiment, two film members 17A and 17B, each of which is made of a polarizing film, are provided. The film member 17A is disposed between the light guide member 12 and the optical sheet 13 and the film member 17B is disposed on the front surface of the glass member 14, as described above.

In order to maintain a state in which the light guide member 12 is installed on the frame 15, the rear cover 18 to support the rear surface of the light guide member 12 is disposed on the rear surface of the light guide member 12. Here, the side end of the rear cover 18 is fixed to the frame 15.

The side surface of the light guide member 12 is separated from the frame 15 so that light irradiated by the light source 11 is incident upon the light guide member 12 through the side surface thereof, and the light emitting diodes 11a are disposed at the rear portion of a space between the side surface of the frame 15 and the side surface of the light guide member 12. Further, a reflective plane 15b, which is formed to have a curved surface so as to reflect the light irradiated by the light emitting diodes 11a toward the side surface of the light guide member 12, is provided on the inner surface of the frame 15 facing the side surface of the light guide member 12. In this exemplary embodiment, the frame 15 is made of a metal, such as aluminum, so as to reflect light.

In order to install the light emitting diodes 11a at the rear portion of the space between the side surface of the frame 15 and the side surface of the light guide member 12, a light source installation part 18a integrally extended backwards from the side end of the rear cover 18 is provided at the side end of the rear cover 18 such that the light source 11 is installed in the light source installation part 18a. The light source 11 is installed in the light source installation part 18a such that the rear surface of the substrate 11b is supported by the light source installation part 18a, and a spacer 19, the front surface of which is supported by the rear surface of the light guide member 12 and the rear surface of which is supported by the front surface of the substrate 11b, is disposed between the rear surface of the light guide member 12 and the substrate 11b.

Since light generated by the light emitting diodes 11a is irradiated in an approximate fan shape, overlapping and mixing of the light generated by the plural light emitting diodes 11a occur. Therefore, in order to obtain uniform brightness, a designated mixing distance or more is required. In order to secure such a mixing distance, the bezel part 10b requires a width of more than a designated value, thus limiting reduction of the width of the bezel part 10b.

Therefore, if the light emitting diodes 11a are disposed at the rear portion of the space between the inner surface of the frame 15 and the side surface of the light guide member 12 and the reflective plane 15b is provided on the inner surface of the frame 15 facing the side surface of the light guide member 12, light irradiated by the light emitting diodes 11a moves by a designated distance in the forward and backward directions, is reflected by the reflective plane 15b, moves back to the side surface of the light guide member 12, and is then incident upon the light guide member 12 through the side surface of the light guide member 12. Therefore, the movement distance of the light irradiated by the light emitting diodes 11a to the side surface of the light guide member 12 may be greatly reduced and the mixing distance may be sufficiently secured. Thus, the width of the bezel part 10b may be reduced by the amount by which the movement distance of the light to the side surface of the light guide member 12 is reduced.

Figure 3:
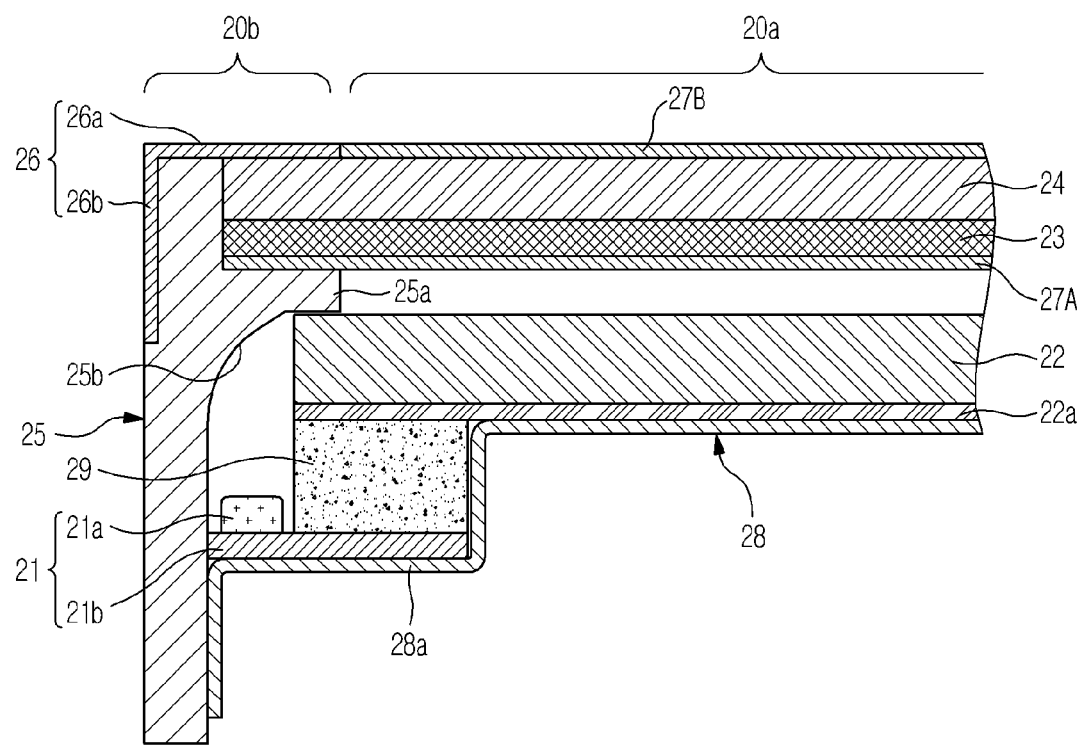
FIG. 3 is a cross-sectional view of a display apparatus in accordance with another exemplary embodiment of the present invention.

Although this exemplary embodiment describes the optical sheet 13 as being disposed on the front surface of the light guide member 12, the position of the optical sheet 13 is not limited thereto. That is, as shown in FIG. 3 illustrating a display apparatus 20 in accordance with another exemplary embodiment of the present invention, including display part 20a and bezel part 20b, an optical sheet 23 which may be disposed on the rear surface of a glass member 24 and a support rib 25a may support the rear surface of the optical sheet 23, film members 27A and 27B, reflective sheet 22A, rear cover 28, 28a light source installation part, and light source 21 having light emitting diode 21a and substrate 21b.

Hereinafter, with reference to FIG. 4, a display apparatus 30 in accordance with another exemplary embodiment of the present invention will be described.

Figure 4:
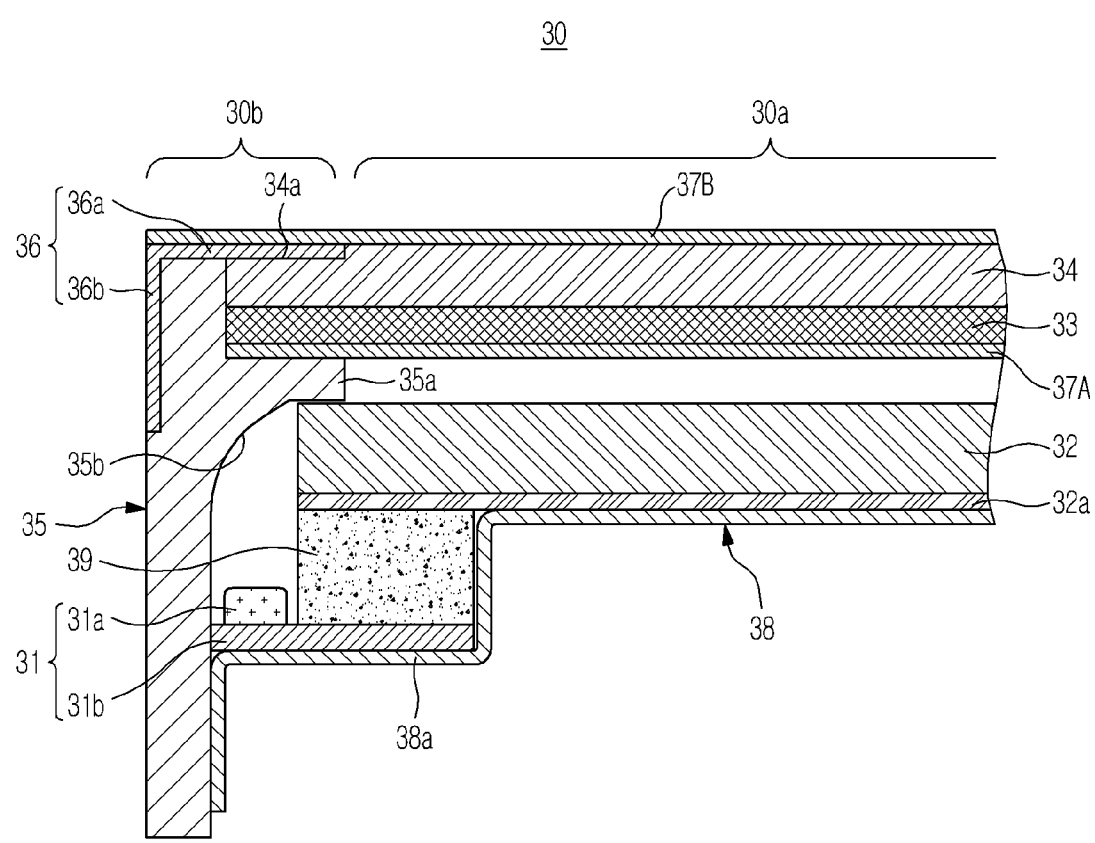
FIG. 4 is a cross-sectional view of a display apparatus in accordance with another exemplary embodiment of the present invention.

As shown in FIG. 4, the display apparatus 30 in accordance with this exemplary embodiment includes display part 30a and bezel part 30b, a light source 31 having light emitting diode 31a and substrate 31b, a light guide member 32, an optical sheet 33, a glass member 34, a frame 35, a support member 36 having front support part 36a and side support part 36b, film members 37A and 37B, and a rear cover 38 and light source installation part 38a.

In this exemplary embodiment, an installation recess 34a in which a front support part 36a of the support member 36 is installed is provided at the edge of the front surface of the glass member 34. Here, the thickness of the installation recess 34a is equal to the thickness of the front support part 36a. If the thickness of the installation recess 34a is equal to the thickness of the front support part 36a, the front surface of the front support part 36a and the front surface of the glass member 34 excluding the portion of the glass member 34 provided with the installation recess 34a become coplanar.

A film member 37B is disposed on the front surface of the front support part 36a and the remaining portion of the front surface of the glass member 34 excluding the portion of the glass member 34 provided with the installation recess 34a. Thereby, a region of the display apparatus 30 provided with the remaining portion of the glass member 34 excluding the portion thereof provided with the installation recess 34a constitutes a display part 30a, and a region of the display apparatus 30 provided with the front support part 36a constitutes a bezel part 30b. Light having passed through the edge of the light guide member 32 supported by a support rib 35a is blocked by the support rib 35a, and thus is not transmitted to the front of the support rib 35a. Therefore, the front support part 36a of the support member 36 may have a width corresponding to that of the support rib 35a.

Hereinafter, with reference to FIG. 5, a display apparatus 40 in accordance with another exemplary embodiment of the present invention will be described.

Figure 5:
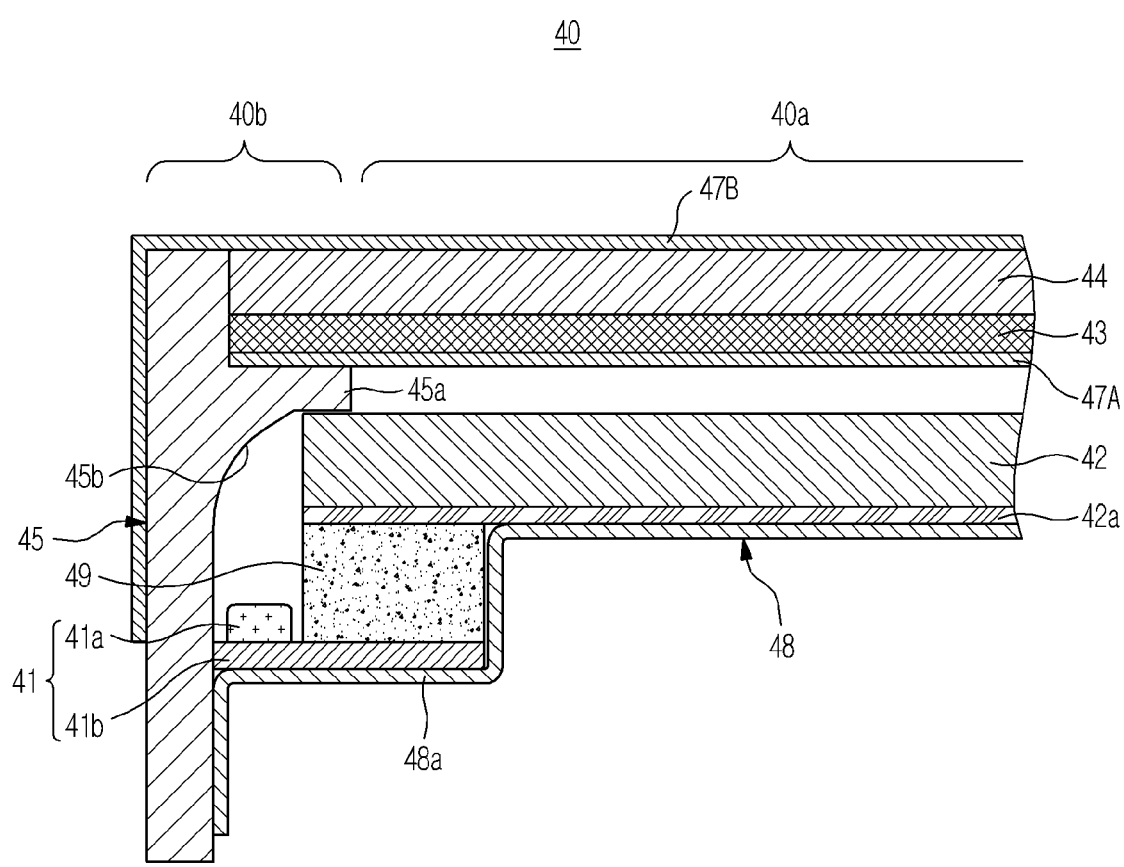
FIG. 5 is a cross-sectional view of a display apparatus in accordance with another exemplary embodiment of the present invention.

As shown in FIG. 5, the display apparatus 40 in accordance with this exemplary embodiment includes display part 40a and bezel part 40b, a light source 41 having light emitting diode 41a and substrate 41b, a light guide member 42 having reflective sheet 42a, an optical sheet 43, a glass member 44, a frame 45, film members 47A and 47B, and a rear cover 48 with light source installation part 48a.

The front surface of the glass member 44 is coplanar with the front surface of the frame 45, and the film member 47B is disposed on the front surface of the glass member 44 and the front surface of the frame 45. In this exemplary embodiment, the side end of the film member 47B is extended backwards so that the film member 47B covers the side surface of the frame 45 as well as the front surface of the glass member 44 and the front surface of the frame 45. Since the film member 47B covers the front surface of the glass member 44 and the front and side surfaces of the frame 45, the film member 47B serves to maintain a state in which the glass member 44 is installed on the frame 45.

A support rib 45a protruded from the inner surface of the frame 45 to support the edge of the rear surface of the glass member 44 is formed on the frame 45, and light having passed through the light guide member 42 does not pass through the support rib 45a. Therefore, a region of the display apparatus 40 provided with the front surface of the frame 45 and the edge of the glass member 44 supported by the support rib 45a constitutes a bezel part 40b, and a region of the display apparatus 40 provided with the remaining portion of the glass member 44 excluding the edge of the glass member 44 constitutes a display part 40a.

If the front surface of each of the display parts 10a, 20a, 30a and 40a and the front surface of each of the bezel parts 10b, 20b, 30b and 40b are coplanar, as described in the above exemplary embodiments, each of the display parts 10a, 20a, 30a and 40a and each of the bezel parts 10b, 20b, 30b and 40b are not indistinguishable in appearance, and thus display apparatuses 10, 20, 30 and 40 having a simpler design may be implemented.

Figure 6:
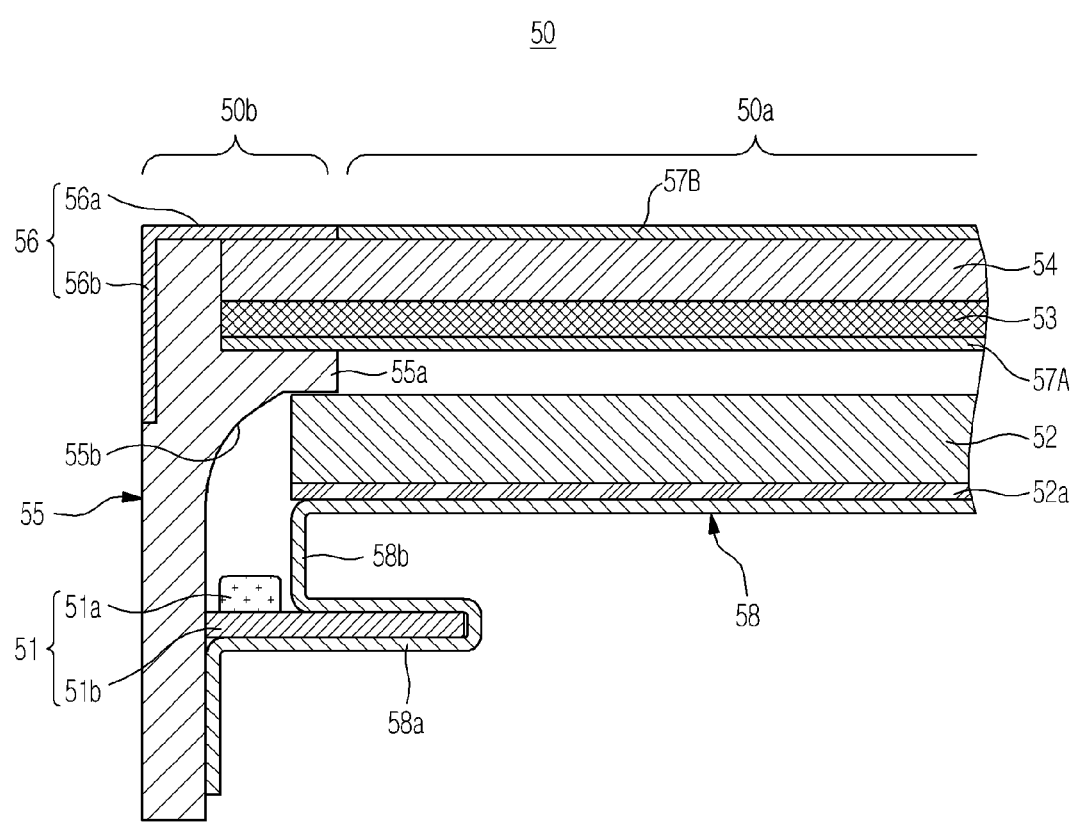
FIG. 6 is a cross-sectional view of a display apparatus in accordance with a further exemplary embodiment of the present invention.

Although the above exemplary embodiments describe that the light sources 11, 21, 31 and 41 are separated from the rear surfaces of the light guide members 12, 22, 32 and 42 by the spacers 19, 29, 39 and 49, disposition of the light sources 11, 21, 31 and 41 is not limited thereto. That is, as shown in FIG. 6, in a display apparatus 50 in accordance with a further exemplary embodiment of the present invention, including display part 50a and bezel part 50b, a light source 51, having light emitting diode 51a and substrate 51b, which is disposed at the rear portion of a space between the inner surface of a frame 55 and the side surface of a light guide member 52 (including reflective sheet 52a) by a spacer part 58b integrally extended backwards from the side end of a rear cover 58 to support the front surface of a substrate 51b of the light source 51 and a light source installation part 58a integrally extended from the spacer part 58b to support the rear surface of the substrate 51b of the light source 51. The display apparatus 50 also includes optical sheet 53, glass member 54 and film members 57A and 57B.

Although the above exemplary embodiments describe the frames 15, 25, 35, 45 and 55 as being made of a metal, such as aluminum, so as to reflect light irradiated by the light emitting diodes 11a, 21a, 31a, 41a and 51a, the frames 15, 25, 35, 45 and 55 are not limited thereto. That is, the frames 15, 25, 35, 45 and 55 may be made of a material, which does not efficiently reflect light, and a white or silver film member may be attached to the reflective planes 15b, 25b, 35b, 45b and 55b or white or silver paint may be applied to the reflective planes 15b, 25b, 35b, 45b and 55b so as to achieve efficient light reflection.

As is apparent from the above description, a display apparatus in accordance with one exemplary embodiment of the present invention allows the front surface of a display part and the front surface of a bezel part to be substantially coplanar with each other such that the display part and the bezel part are indistinguishable in appearance, thereby achieving a simpler design of the display apparatus.

Further, in the display apparatus in accordance with the exemplary embodiment of the present invention, a light source is disposed at the rear portion of a space between a frame and a light guide member and a reflective plane to reflect light, irradiated by light emitting diodes located at the rear of the frame, to the side surface of the light guide member is provided on the frame, thereby causing the light irradiated by the light emitting diodes to move forwards by a designated distance and then to be reflected and be incident upon the side surface of the light guide member, thus being capable of reducing the width of the bezel part while securing a sufficient mixing distance.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:
1. A display apparatus comprising:
a display part operable to display an image;
a bezel part disposed at an edge of the display part;
a glass member which is transparent;
a frame which supports a side surface of the glass member; and
a film member disposed on a front surface of the glass member and a front surface of the frame,
wherein the film member entirely covers the front surface of the frame, and
wherein a side end of the film member is extended backwards and the film member covers a side surface of the frame so that the film member serves to maintain a state in which the glass member is installed on the frame.
2. The display apparatus according to claim 1, wherein the front surface of the glass member is coplanar with the front surface of the frame.
3. The display apparatus according to claim 1, wherein the film member includes a polarizing film.
4. The display apparatus according to claim 1, wherein at least a portion of a front surface of the display part and a front surface of the bezel part are coplanar.
5. The display apparatus according to claim 1, further comprising an optical sheet disposed at a rear of the glass member.

* * * * *